United States Patent [19]

Kamatani et al.

[11] 4,381,348

[45] Apr. 26, 1983

[54] BLUE COLORED ARTIFICIAL STONE STOCKS AND METHOD OF MANUFACTURING THE SAME

[75] Inventors: Toshio Kamatani, Kosugi; Hirohisa Ishiguro, Sinminato; Kensei Itakura, Shinminato; Kazuo Yamagishi, Niigata, all of Japan

[73] Assignee: Nippon Kokan Kabushiki Kaisha, Tokyo, Japan

[21] Appl. No.: 335,186

[22] Filed: Dec. 28, 1981

[30] Foreign Application Priority Data

Dec. 29, 1980 [JP] Japan .................................. 55-188612
Aug. 26, 1981 [JP] Japan .................................. 56-132592

[51] Int. Cl.³ ............................................. C04B 35/00
[52] U.S. Cl. .................................... 501/153; 501/154; 501/155

[58] Field of Search ................. 501/154, 155, 117, 86, 501/153; 106/117

[56] References Cited

FOREIGN PATENT DOCUMENTS 53-138411 12/1978 Japan .................................. 106/117

Primary Examiner—James Poer
Attorney, Agent, or Firm—Frishauf, Holtz, Goodman & Woodward

[57] ABSTRACT

A low cost beautiful blue colored artificial stone stock is obtained by using a high carbon or low carbon slag formed at the time of preparing ferrochromium, as it is or after incorporated with an expensive addition. The stone stock has a composition of 40–70% by weight of $SiO_2$, 0.1–5% by weight of a low grade chromium oxide and the balance of CaO, MgO and $Al_2O_3$.

10 Claims, 2 Drawing Figures

BLUE COLORED ARTIFICIAL STONE STOCKS AND METHOD OF MANUFACTURING THE SAME

BACKGROUND OF THE INVENTION

This invention relates to a blue colored artificial stone stock utilized for various buildings, ornamental articles, pavements or the like purposes, and a method of manufacturing the same.

For many thousands of years, stone stocks have been used widely for constructing buildings, structures or the like. While various kinds of gray, white, black, red, brown, green and yellow colored stone stocks have been used, blue colored stone stocks have been used seldom because there are few natural sources thereof. Although it is possible to manufacture blue colored coagulated stocks by using colored cement or pigment, such coagulated stocks are inferior to natural stone stocks from the standpoint of beauty. Slags formed at the time of manufacturing such ferrochromiums as a high carbon ferrochromium or silicochromium are generally discarded. For example, a high carbon ferrochromium slag is gray black, a silicochromium slag and a low carbon ferrochromium slag are gray so that these slags cannot be used for ornamental purposes, and they are used to construct road beds or ballast. Crushed high carbon ferrochromium slag is often used as a polishing agent but cannot be used for ornamental purposes.

SUMMARY OF THE INVENTION

Accordingly it is an object of this invention to obtain beautiful blue colored artificial stone stock that can be used for various ornamental purposes at a low cost.

As a result of our investigation over many years we have found that when ferrochromium slags are cooled slowly they are converted into a beautiful blue colored stone stock that can be used for ornamental purposes, and that especially when the slag contains 40 to 70% by weight of $SiO_2$ and 0.1 to 5% by weight of low grade chromium oxide. Silicochromium is generally prepared by firstly obtaining high carbon ferrochromium containing 6 to 8% by weight of carbon from a chromium ore, coke and iron ore, and then adding $SiO_2$ to the high carbon ferrochromium. Another type of silicochromium is prepared by adding silica to the raw material for preparing the high carbon ferrochromium. The latter type of silicochromium generally has a composition of $SiO_2$: 44–47%, total chromium: 0.2–0.7%, CaO: 7–13%, MgO: 17–23%, $Al_2O_3$: 15–20%, whereas a high carbon ferrochromium slag has a composition of $SiO_2$: 27–32%, total chromium: 2–3%, CaO: 3–4%, $Al_2O_3$: 15–20%, MgO: 18–23% (all by weight). We have found that when the compositions of these slags are modified such that their $SiO_2$ content is increased to 40–70% and a small quantity of low grade chromium oxide, for example 0.1–5% by weight of CrO is added, and that when the molten slag is cooled slowly, beautiful blue colored artificial stone stock can be obtained. Similar artificial stone stocks can be obtained by adding silica to not only the aforementioned silicochromium slag but also to the high carbon or low carbon ferrochromium slag in an amount of 40–70% by weight. Although direct use of the ferrochromium slag formed in a furnace for preparing ferrochromium is thermally economic, if desired, a solidified slag may be melted again and its composition can be adjusted in the molten state.

The term "a low grade chromium oxide" used herein and in the claims is defined to mean a chromium oxide which has an oxidation number of up to 2, excluding $Cr_2O_3$ (oxidation number of 3) or $CrO_3$ (oxidation number of 6) for example. Thus, the low grade chromium oxide mainly comprises CrO.

Slow cooling is generally performed by air cooling in which case, the molten slag is poured into a container or a mold to facilitate slow cooling. If the molten slag is cooled rapidly, the stone stocks thus obtained are not satisfactorily crystalized and become glass-like, thereby affecting the strength and the beautiful appearance thereof. Where the artificial stone stock is to be formed as a thin sheet or plate, it is necessary to slowly cool the cast slag in a furnace at a rate of less than 10° C./min., and preferably less than 3° C./min.

We have also succeeded in producing beautiful artificial stone stocks having a definite chromaticity by selecting the quantities of $Cr_2O_3$ and a reducing agent in specified ranges and by controlling the content of total chromium to a specified range. This enables use as the raw material not only the ferrochromium slag but also other mineral materials.

More particularly, even when the quantities of $SiO_2$ and the low grade chromium oxide (CrO) were selected in the ranges specified hereinabove, the chromaticity of the resulting artificial stone stock is not always definite. Accordingly, according to a modification of this invention the quantities of $Cr_2O_3$ and the reducing agent in the raw material are selected to be in the specified ranges and moreover the content of the total chromium in the product is controlled so as to always obtain products of desired chromaticity.

Summarizing the above, according to one aspect of this invention there is provided a blue colored artificial stone stock containing 40–70% by weight of $SiO_2$, 0.1–5% by weight of a low grade chromium oxide, and the balance of CaO, MgO and $Al_2O_3$.

According to another aspect of this invention there is provided a method of manufacturing a blue colored artificial stone stock comprising the steps of preparing a raw material selected from the group consisting of a high carbon ferrochromium slag, a low carbon ferrochromium slag and a silicochromium slag and a mixture thereof; adding $SiO_2$ to the raw material; melting the resulting mixture; adjusting the composition of a molten mixture such that it contains 40–70% by weight of $SiO_2$ and 0.1–5% by weight of a low grade chromium oxide; and then slowly cooling the molten mixture. The slow cooling is preferably effected at a rate of less than 10° C./min., and more preferably at a rate of less than 3° C./min.

According to still another aspect of this invention there is provided a method of manufacturing a blue colored artificial stone stock comprising the steps of preparing a raw material mixture of a Cr containing mineral, a Si containing mineral and a reducing agent, the quantity of $Cr_2O_3$ in the raw material being 4–8% by weight and the quantity of the reducing agent being 1.4–1.8 times of stoichiomatic quantity necessary to reduce said $Cr_2O_3$ to CrO, melting the raw material, treating the molten raw material to adjust the quantity of total chromium in a resulting product to be 0.7–1.9% by weight.

BRIEF DESCRIPTION OF THE DRAWING

In the accompanying drawing.

DESCRIPTION OF THE PREFERRED EMBODIMENTS

Figure 1:
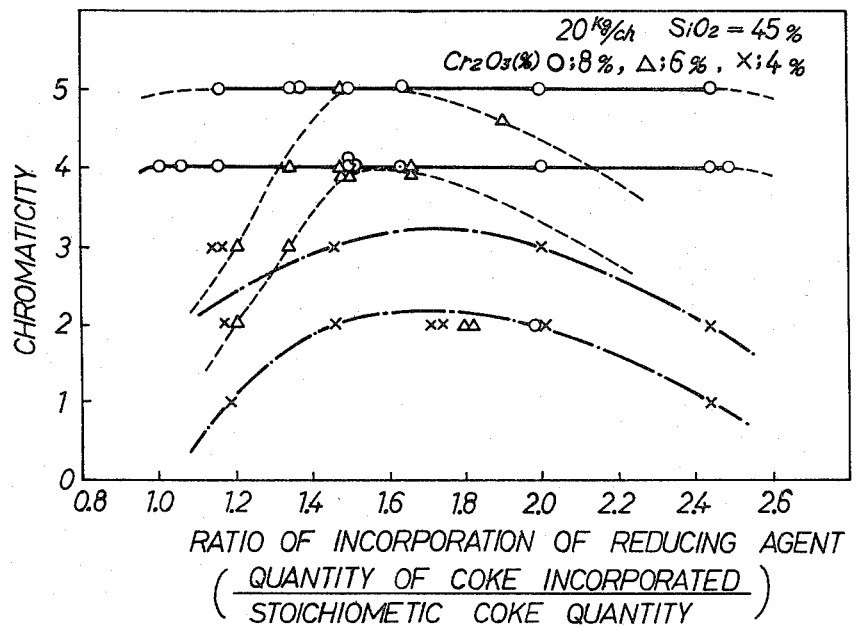
FIG. 1 is a graph showing the relation between the chromaticity of the product and the ratio of reducing agent.

To have better understanding the following examples are given, in which all percentages are weight percentages.

EXAMPLE 1

To 2000 Kg of a high carbon ferrochromium slag having a composition of $SiO_2$: 30.2%, total Cr: 2.5%, CaO: 4.0%, $Al_2O_3$: 31.0% were added 440 Kg of a low carbon ferrochromium slag, 1140 Kg of silica and 10 Kg of coke, and then the mixture was melted in an electric furnace. The molten mixture was poured into a mold having a diameter of 150 cm and a depth of 100 cm and then slowly cooled to room temperature in air over about 48 hours. The resulting deep blue colored artificial stone stock contained numerous fine needle-like crystals in the surface thereof and was very beautiful.

The cooled stone stock was cut into a slab having a size of 4 cm×30 cm×30 cm and exposed to daylight and rain on the outside for 300 days. Even after said test the color tone and the contact feeling were substantially the same as those of the as manufactured stock.

EXAMPLE 2

To 2000 Kg of a silicochromium slag having a composition of $SiO_2$: 45.0%, total Cr: 0.9%, CaO: 13.2%, $Al_2O_3$: 19.4% and MgO: 18.0% were added 200 Kg of silica, 20 Kg of chromium ore and 10 Kg of coke, and the mixture was melted in an electric furnace, then casted in a mold identical to that used in Example 1 and cooled slowly. The resulting artifical stone stock had the same color and surface structure as those of Example 1.

EXAMPLE 3

To 2000 Kg of a mixture of 60% of a low carbon ferrochromium slag having a composition of $SiO_2$: 30.5%, CaO: 49.0%, $Al_2O_3$: 8.0%, MgO: 9.0% and FeO: 0.3% and 40% of silica, were added 10 Kg of coke and 20 Kg of chromium ore and the mixture was melted, casted and slowly cooled in the same manner as in Example 1. The resulting stone stock had a color tone and surface structure comparable with those of Examples 1 and 2.

EXAMPLE 4

To 20 Kg of chromium ore, 140 Kg of silica, 6 Kg of coke, 40 Kg of magnesia and 20 Kg of lime stone were added and the mixture was melted in an electric furnace, the molten mixture was poured into a mold identical to that used in Examples 1 to 3 and the cooled slowly to obtain a a deep blue colored artificial stone stock having a composition of $SiO_2$: 55%, low grade chromium oxide (CrO): 1.5%, CaO: 10.0%, $Al_2O_3$: 7.0% and MgO: 23.0%.

In the foregoing Examples 1 to 3, although high and low carbon ferrochromium slags and silicochromium slag were used respectively, it will be clear that it is possible to use mixtures thereof regardless of whether the slags are hot or cold.

EXAMPLE 5

A raw material was prepared by admixing 11.03 Kg of chromium ore, 25.35 Kg of silica, 4.38 Kg of calcined lime, 8.28 Kg of $Al_2O_3$ and 10.95 Kg of MgO. To this raw material was added coke acting as a reducing agent in an amount equal to 1.5 times of the stoichiometric quantity necessary to reduce $Cr_2O_3$ and iron oxide contained in the chromium ore into CrO and Fe. The resulting mixture was melted and slowly cooled at a rate of 3° C./min. to obtain a beautiful blue colored artificial stone stock having a chromaticity of 5. The structure and appearance of this stone stock resemble those of a natural stone stock.

The blue colored artificial stone stocks of this invention have a contact feel and a structure comparable with that of natural products, and a beautiful blue color which cannot be obtained by the conventional stone stocks. Although the reason why our artificial stone stocks have such a beautiful appearance has not yet been fully clarified, it is assumed that a low grade chromium oxide is melted with $SiO_2$ to increase its stability. In a case wherein the quantity of $SiO_2$ contained in the melted mixture is less than 40% and a low grade chromium oxide is absent therein, the product shows a color identical to that of the ferrochromium slag as it is, whereas in a case wherein the quantity of $SiO_2$ is 40 to 70% and a low grade chromium oxide is present and stabilized by forming a solid solution together with $SiO_2$, a beautiful blue color can be obtained. Since more than 60% of $SiO_2$ tends to decrease brittleness of the structure of the product, if desired, the quantity of $SiO_2$ should preferably be less than 62%.

The blue colored artificial stone stocks according to this invention have generally the following composition:

$SiO_2$: 40–70% (preferably 48–60%)
low grade chromium oxide: 0.1–5% (preferably 0.3–3%)
CaO: 5–15%
MgO: 17–23%
$Al_2O_3$: 6–20%

Where the slag formed in a hard reducing atmosphere, it is necessary to add a small quantity of a powder or pellet of chromium ore to assure the presence of the low grade chromium oxide.

Figure 2:
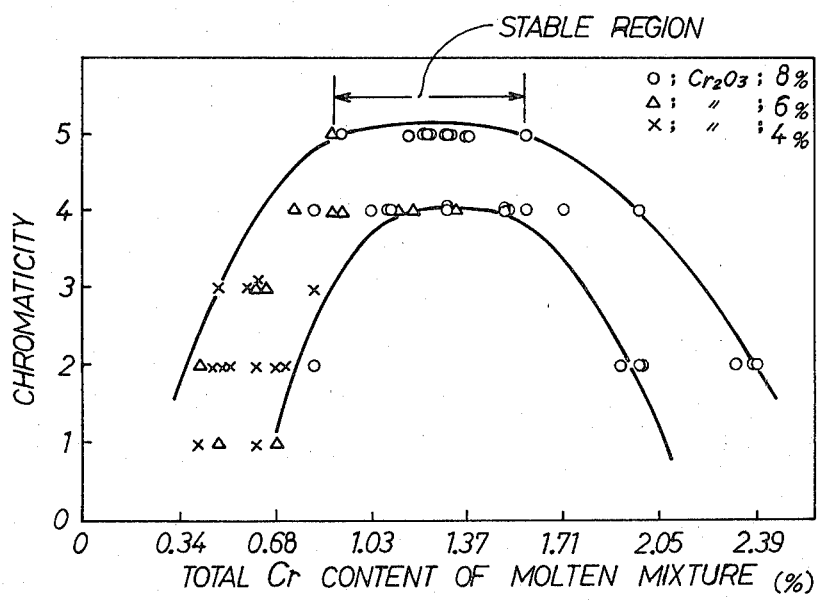
FIG. 2 is a graph showing the relation between the chromaticity of the product and the total chromium content of a molten mixture.

FIG. 1 shows the relation between chromaticity and the ratio of reducing agent, while FIG. 2 shows the relation between chromaticity and total Cr content of molten mixture. To obtain a blue colored artificial stone stock having a chromaticity of 5, it is advantageous that the quantity of the coke should be 1.4–1.6 times of the stoichiometric quantity and that the content of $Cr_2O_3$ in the admixed raw material should be high as far as possible (for example 7–8%), these conditions being indispensable to obtain beautiful blue color. Many samples prepared from molten slags containing 1.1–1.4% of total chromium showed substantially the same appearance (color). Other reducing agent than coke can be used.

The chromaticity shown in FIGS. 1 and 2 are determined according to the standard of judgement shown in the following Table.

TABLE

| Chromaticity | color |
| --- | --- |
| 1 | gray |
| 2 | blueish gray |

TABLE-continued

| Chromaticity | color |
|---|---|
| 3 | intermediate of gray and blue |
| 4 | perfect blue |
| 5 | deep blue |

In a case shown by dot and dash lines (shown by symbols X) shown in FIG. 1 in which the quantity of $Cr_2O_3$ in the raw material is at a minimum value of the specified range, by increasing the quantity of the reducing agent from 1.2 to 1.4 times of the stoichiometric quantity, the blue color chromaticity increases rapidly so that in a range of 1.4 to 1.8 times it is possible to obtain blue colored artificial stone stocks having chromaticities of 2 to 3. This is also true in a case shown by dotted lines (shown by symbols Δ) in which the content of $Cr_2O_3$ in the raw material is 6%. In this case, the resulting stone stocks have a chromaticity of 3 to 5 when 1.4–1.8 times of the reducing agent is used. As shown, where the quantity of $Cr_2O_3$ is adjusted to 8% by weight the products have a chromaticity of 4–5.

When the raw material is melted and reduced in a furnace, metallic chromium would deposit on the inner surface of the furnace and the molten artificial stone would be surrounded by the deposited chromium layer. In any case, the total quantity of Cr in the product should be adjusted to be in a range of 0.7–1.9%. As shown by symbols X in FIG. 2, in a case wherein the quantity of $Cr_2O_3$ in the raw material is 4%, that is the minimum, products having a chromaticity higher than 2 can be obtained with a high probability. Where the content of $Cr_2O_3$ in the raw material is 6% (symbols Δ) and 8% (symbols o) products have a chromaticity of higher than 4. As the Cr content increases the chromaticity decreases below 2, even when the $Cr_2O_3$ content is 8%.

As above described, according to this invention it is possible to manufacture beautiful blue colored artificial stone stocks having any desired chromaticity which can be used to construct buildings, structures, ornamental articles, pavements or the like. Moreover, as the raw material, slags formed at the time of preparing various types of ferrochromium can be used as they are or after addition thereto of a small quantity of inexpensive additive or natural chromium ore so that the artificial stone stock of this invention can be manufactured at a low cost.

What is claimed is:

1. A blue colored artificial stone stock containing 40–70% by weight of $SiO_2$, 0.1–5% by weight of chromium oxide having an oxidation number up to 2 and the balance of CaO, MgO and $Al_2O_3$.

2. A blue colored artificial stone stock containing 40–70% by weight of $SiO_2$, 0.1–5% by weight of chromium oxide having an oxidation number up to 2, 5–15% by weight of CaO, 17–23% by weight of MgO and 6–20% by weight of $Al_2O_3$.

3. A method of manufacturing a blue colored artificial stone stock comprising the steps of:
    preparing a raw material selected from the group consisting of a high carbon ferrochromium slag, a low carbon ferrochromium slag and a silicochromium slag and mixture thereof;
    adding $SiO_2$ and a reducing agent to said raw material;
    melting the resulting mixture;
    adjusting the composition of the molten mixture so that it contains 40 to 70% by weight of $SiO_2$ and 0.1 to 5% by weight of chromium oxide having an oxidation number up to 2; and
    then slowly cooling the molten mixture to form said blue colored artificial stone stock.

4. The method according to claim 3 wherein said cooling is effected at a rate of less than 10° C./min.

5. A method of manufacturing a blue colored artificial stone stock comprising the steps of:
    preparing a raw material mixture of a chromium containing mineral, a silicon containing mineral and a reducing agent;
    the quantity of $Cr_2O_3$ in said raw material being 4–8% by weight and the quantity of said reducing agent being 1.4–1.8 times the stoichiometric quantity necessary to reduce said $Cr_2O_3$ to CrO;
    melting said raw material to form a molten mixture; and adjusting the composition of said molten mixture so that it contains 40–70% by weight $SiO_2$ and 0.7–1.9% by weight total chromium.

6. The method according to claim 5 wherein when said raw material contains an iron oxide, and the quantity of said reducing agent is 1.4–1.8 times the stoichiometric quantity necessary to reduce said $Cr_2O_3$ and said iron oxide to CrO and Fe.

7. The method according to claim 5 wherein said raw material comprises a slag formed at the time of preparing ferrochromium.

8. The method according to claim 5 or 6 wherein said reducing agent comprises coke.

9. The method of claim 3 wherein said molten mixture contains between 48 and 60% $SiO_2$, and between 0.3 and 3% of said chromium oxide, and wherein said reducing agent comprises coke.

10. The blue colored artificial stone stock according to claim 1 or 2 which contains between 48 and 60% $SiO_2$, and between 0.3 and 3% of said chromium oxide.

* * * * *